United States Patent [19]

Yamaoka et al.

[11] 4,406,701
[45] Sep. 27, 1983

[54] ELECTROCONDUCTIVE PASTE

[75] Inventors: Nobutatsu Yamaoka, Harunamachi; Kazuo Sasazawa, Maebashi, both of Japan

[73] Assignee: Taiyo Yuden Co., Ltd., Tokyo, Japan

[21] Appl. No.: 349,311

[22] Filed: Feb. 16, 1982

[30] Foreign Application Priority Data

Feb. 27, 1981 [JP] Japan .................................. 56-27880

[51] Int. Cl.³ ............................................ H01B 1/02
[52] U.S. Cl. ................................. 106/1.17; 106/1.13; 252/512; 252/520
[58] Field of Search ................. 106/1.17, 287.19, 1.13; 252/512, 520

[56] References Cited

U.S. PATENT DOCUMENTS

| | | | |
|---|---|---|---|
| 3,484,284 | 12/1969 | Dates et al. | 252/512 |
| 3,647,532 | 3/1972 | Friedman et al. | 252/512 |
| 3,784,407 | 1/1974 | Shiio et al. | 252/512 |
| 3,796,582 | 3/1974 | Leahey et al. | 106/1.17 |

FOREIGN PATENT DOCUMENTS 650584  7/1964  Belgium .............................. 106/1.17

Primary Examiner—Lorenzo B. Hayes
Attorney, Agent, or Firm—Woodcock, Washburn, Kurtz, Mackiewicz & Norris

[57] ABSTRACT

An electroconductive paste consists essentially of 100 parts by weight of zinc in finely divided form, from about 0.01 to 10.00 parts by weight of a glass frit such as, typically, that of $PbO-B_2O_3-SiO_2$ composition, from about 0.01 to 14.99 parts by weight of an organotitanium compound such as tetrakisstearoxytitanium, and a vehicle such as alpha-terpineol containing ethylcellulose as an organic binder, for pasting the mixture of the zinc powder, glass frit and organotitanium compound. The paste may contain an additive or additives such as the oxides of some metallic elements. By being fired on ceramic bodies at a temperature above the melting point of zinc, the paste forms conductors or electrodes of ceramic capacitors, varistors or the like. The capacitors or varistors having their conductors or electrodes thus prepared from the zinc paste are approximately equivalent in electrical and mechanical properties to those having their conductors or electrodes fabricated from a conventional silver paste.

10 Claims, 5 Drawing Figures 4,406,701

ELECTROCONDUCTIVE PASTE

This invention relates to a novel electroconductive composition in paste form, and more specifically to such an electroconductive paste to be baked or fired on ceramic bodies for use as conductors or electrodes of ceramic capacitors, varistors or the like.

As is well known, in the fabrication of ceramic capacitors or ceramic varistors, the conductors or electrodes are formed by baking the coatings of electroconductive pastes on ceramic bodies. Typical of such pastes as heretofore used is what is known as a silver paste, composed of powdered silver, a glass frit, and a vehicle or the liquid ingredient or ingredients of the paste. The silver paste is itself an excellent material for the purposes. When used for the conductors of ceramic capacitors, for example, it can provide desired capacitance, dielectric loss tangent (the tangent of the dielectric loss angle), and a firm bond between the conductors and ceramic bodies of the capacitors. Offsetting all these advantages, however, is the expensiveness of silver, a precious metal, which adds considerably to the costs of the electrical components.

The present invention solves the problem of the prior art by providing a materially less expensive substitute for the silver paste. Although inexpensive, the electroconductive paste in accordance with the invention provides the desired electrical properties in its intended use as conductors or electrodes of ceramic capacitors, varistors or the like. Further the conductors or electrodes made from the inventive paste adhere to the ceramic bodies with sufficient strength.

Stated broadly, the electroconductive paste in accordance with the invention is composed of 100 parts by weight of zinc powder, from about 0.01 to 10.00 parts by weight of a glass frit, from about 0.01 to 14.99 parts by weight of an organotitanium compound, and a vehicle for pasting the mixture of the zinc powder, glass frit and organotitanium compound. The sum of the parts by weight of the glass frit and the organotitanium compound in use is up to about 15. As required or desired, the paste may contain an additive or additives typically selected from the oxides of some metallic elements.

The zinc paste, as the electroconductive paste of this invention will hereinafter be so called for simplicity, is not just a cheap substitute for the silver paste. When the zinc paste is used as the conductors of strontium titanate ceramic semiconductor capacitors, for example, by being fired on the ceramic bodies, the capacitance of the capacitors becomes even higher than that of conventional capacitors with their conductors made from the silver paste. Thus the zinc paste can reduce the size of capacitors of this class for a given capacitance. To give another example, titanium dioxide ceramic varistors having their electrodes made from the zinc paste are just as excellent in electrical and mechanical properties as those having the conventional silver electrodes. Both of these applications of the zinc paste will be discussed in more detail in the subsequent disclosure of specific Examples of the invention.

Among the advantages offered by the zinc paste is that it admits of baking or firing in atmosphere. This is because, filling the interstices of the zinc powder, the glass and titanium compound ingredients of the paste limit the oxidation of the individual zinc particles. For this reason the electrical ceramic components with the zinc conductors or electrodes are mass producible at reduced costs. As regards the inexpensiveness of the zinc paste itself, suffice it to say that powdered zinc is available at approximately 1/200 the cost of powdered silver.

The above and other features and advantages of this invention and the manner of attaining them will become more apparent, and the invention itself will best be understood, from a study of the following detailed description taken together with the attached drawings, in which.

Figure 1:
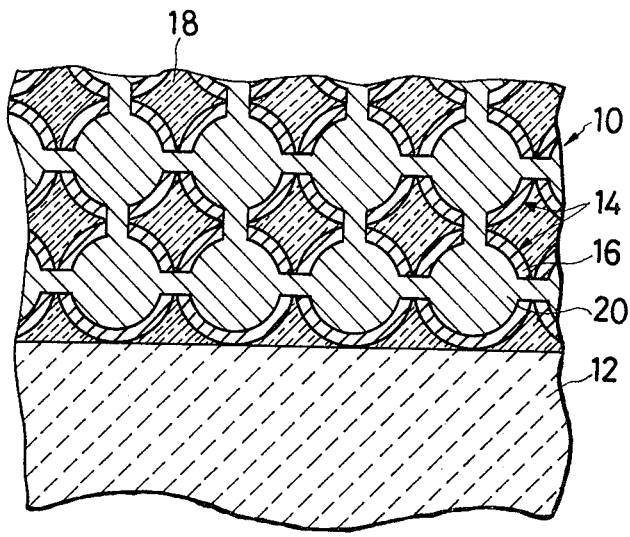
FIG. 1 is a fragmentary sectional view diagrammatically illustrating, on a greatly magnified scale, a conductive region formed on a ceramic body from the zinc paste of this invention, the view being explanatory of the way in which the unoxidized interiors of the zinc particles become fused to each other on baking.

Zinc powder constituting the principal ingredient of the zinc paste of this invention is, for the best results, of spherical particles with a size of not more than about 15 microns. In practice, however, the particle size can be up to about 30 microns, averaging from about 0.1 to 30.0 microns.

From about 0.01 to 10.00 parts by weight of a glass frit or frits and from about 0.01 to 14.99 parts by weight of an organotitanium compound or compounds are added to 100 parts by weight of zinc powder. Both the glass frit and the organotitanium compound are intended to function as inorganic binders and as zinc oxidation inhibitors or retarders, as will become apparent as the description proceeds.

Although the proportions of the glass frit and the organotitanium compound are variable within the respective specified ranges, the combined proportion of the two ingredients should not exceed about 15 parts by weight, because then the conductive regions formed by the resulting zinc paste would offer too much electrical resistance. Such unduly high electrical resistance would also result if the proportion of the glass frit were more than about 10.00 parts by weight, or if the proportion of the organotitanium compound were more than about 14.99 parts by weight.

Should the combined proportion of the glass frit and the organotitanium compound be less than about 0.02 part by weight, on the other hand, then the ingredients would not function as inorganic binders or oxidation inhibitors. Also, since it would become difficult to uniformly disperse them throughout the zinc paste, the conductors or electrodes made therefrom would fluctuate in properties. Should the proportion of either of the glass frit and the organotitanium compound be less than about 0.01 part by weight, they would not cooperate to bring about the desired results.

Preferred examples of glass frits suitable for admixture with zinc powder include those composed of litharge (PbO), boric oxide ($B_2O_3$) and silica ($SiO_2$), of PbO and $B_2O_3$, and of zinc oxide (ZnO), $B_2O_3$ and $SiO_2$, all with a softening point ranging from about 415° to 625° C. and with about 325-mesh particles. Other frit compositions are adoptable as well, such as those comprising any two or more of such metal oxides as PbO, $B_2O_3$, $SiO_2$, ZnO, red lead oxide ($Pb_3O_4$) barium oxide (BaO), zirconium oxide ($ZrO_2$), calcium carbonate ($CaCO_3$), aluminum oxide ($Al_2O_3$), and bismuth trioxide ($Bi_2O_3$). The softening points of such adoptable glass frits can be in the range of about 400°–800° C.

Preferred examples of organotitanium compounds are tetrakisstearoxytitanium, $Ti(O-C_{17}H_{35})_4$, and di-i-propoxybisacetylacetonatetitanium, $Ti(O-iC_3H_7)_2[OC(CH_3)CHCOCH_3]_2$. Other examples adoptable in the practice of the invention include tetrabutoxytitanium, $Ti(O-C_4H_9)_4$, di-n-butoxydibenzyltitanium, $Ti(n-C_4H_9O)_2(CH_2C_6H_5)_2$, di-n-butoxybistriethanolaminatetitanium, $Ti(O-nC_4H_9)_2[OC_2H_4N(C_2H_4OH)_2]_2$, and dihydroxybislactatetitanium, $Ti(OH)_2[OCH(CH_3)COON]_2$.

In fact the invention allows the use of any organotitanium compound which, when the zinc paste is fired in a temperature range of about 500°–900° C., will decompose to provide a titanium oxide. Thus, additional examples are chelates or esters of titanic acid expressed by the general formula, $Ti(OR)_4$, where R is an alkyl or aryl radical.

An organotitanium compound in use can be of either powder or liquid form. In the use of a powdered compound its particle size should not exceed 30 microns for the best results. If the selected compound is used in the form of a solution, with use of toluene, benzene, isopropyl alcohol, etc., as a solvent, then the solvent of a vehicle for pasting its mixture with zinc powder and glass frit may be decreased by an amount corresponding to that of the solvent in the organotitanium compound solution.

A preferred example of the vehicle for pasting the mixture of zinc powder, a glass frit or frits and an organotitanium compound or compounds is alpha-terpineol containing from two to 20% by weight ethylcellulose as an organic binder, or that containing from two to 20% by weight nitrocellulose or polyvinyl alcohol. Instead of alpha-terpineol as a solvent there may be employed butyl "Carbitol" (trademark for diethylene glycol mono-n-butyl ether), butyl "Carbitol" acetate (trademark for diethylene glycol mono-n-butyl ether acetate), or dioctyl phthalate.

Whichever substance is employed, the vehicle will evaporate when the zinc paste is baked on ceramic bodies, and so will be substantially absent from the completed conductive regions on the ceramic bodies. Thus a wide variety of known organic vehicles find use as a pasting agent within the scope of the invention.

Any selected vehicle is to be used in an amount suitable for pasting the zinc mixture. The amount of the vehicle normally ranges from 10 to 50% by weight, preferably from 15 to 25% by weight, and most desirably from 19 to 21% by weight, of the combined weight of zinc powder, a glass frit or frits, and an organotitanium compound or compounds, together with or without an additive or additives to be referred to subsequently. The viscosity of the paste would become too high if the amount of the vehicle were less than 10% by weight, and too low if the amount of the vehicle were more than 50% by weight.

Such being the basic composition of the zinc paste in accordance with the invention, it will now be discussed how it forms conductive regions on ceramic bodies when fired. The discussion will make clear that the use of zinc powder as the main ingredient of the paste is no arbitrary choice but an outcome of extensive experimentation.

FIG. 1 is explanatory of the unique behavior of the zinc paste on firing. This figure is a greatly enlarged, fragmentary section through, for instance, a ceramic capacitor comprising a conductor 10 and a ceramic body 12. The conductor is made from the zinc paste, coated on the ceramic body 12 and baked for several tens of minutes at a temperature above the melting point (419.5° C.) of the zinc powder. When so treated, each zinc particle 14 is oxidized and bears an oxide cladding 16. The oxidation of the zinc powder does not proceed deep into each particle 14 as a region 18 of the glass and titanium compound fills the interstices of the zinc powder. Further, while being baked, and unoxidized interiors 20 of the zinc particles 14 melt and expand at a greater rate than their oxide claddings 16, until the zinc interiors disrupt the oxide claddings and become fused to each other to form the conductor 10. Thus the zinc paste is well suited as a material for the conductors or electrodes of some electrical ceramic components. It may be noted that the fusion of the unoxidized interiors of zinc particles to each other on baking involves a process different from the cohesion of metal particles by sintering.

As has been mentioned, the zinc paste of this invention may comprise from about 0.01 to 5.00 parts by weight of one or more of such additives as, generally, lead (Pb), bismuth (Bi), praseodymium (Pr), copper (Cu), cadmium (Cd), and the compounds of each of these metallic elements. The zinc paste containing such an additive or additives, when baked on ceramic bodies, will adhere thereto more firmly. If used for the conductors of ceramic capacitors, moreover, the zinc paste with such an additive or additives will afford higher capacitance and smaller dielectric loss tangent.

To be more specific, preferred examples of the additives are the oxides of the listed metallic elements, such as $Pb_3O_4$, $Bi_2O_3$, praseodymia ($Pr_6O_{11}$), black copper oxide (CuO), and cadmium oxide (CdO), with a particle size ranging from about 0.1 to 15.0 microns. Uncompounded metals such as those enumerated above are adoptable as well, however. The metals will be converted into oxides upon baking of the zinc paste. Additional examples of additives are PbO, lead dioxide ($PbO_2$), lead tetraacetate ($Pb(CH_3COO)_4$), $Pr_2(C_2H_4O_2)_3$, red copper oxide ($Cu_2O$), and bismuth citrate ($BiC_6H_5O_7$). The hydroxides, salts such as carbonates and oxalates, and peroxides of the metals may also be employed. In short the zinc paste may contain any additive that will become a metal oxide when the paste is baked in a temperature range of, for example, 500° to 900° C. for 10 to 50 minutes.

Experiment has proved that if the proportion of the additive or additives is less than about 0.01 part by weight, no substantial improvements result in such properties of the electrical components as capacitance, dielectric loss tangent, and the strength with which the conductive regions adhere to the ceramic bodies against tensile loading. Such properties may also fluctuate considerably from component to component on mass production if the additive content of the paste is insufficient. If the amount of the additive or additives exceeds about five parts by weight, on the other hand, then the tensile strength will decrease, and the dielectric loss tangent in particular will deteriorate.

Described hereinbelow are Examples of the invention, dealing with specific examples of the zinc paste as actually produced in accordance with the principles of the invention, and the physical properties of ceramic capacitors and varistors having conductors or electrodes made from the zinc paste examples. These Examples, however, are meant purely to illustrate or explain and not to impose limitations upon the invention.

EXAMPLES 1–5

To 100 parts by weight of zinc powder there were added a glass frit in various proportions ranging from 0.01 to 10.00 parts by weight, and an organotitanium compound in various proportions ranging from 0.01 to 14.99 parts by weight, as specifically set forth in Table 1. About 20% by weight of a vehicle was admixed with the mixtures of the zinc powder, the glass frit and the organotitanium compound. The admixtures were agitated for 15 hours to prepare the five zinc pastes of Examples 1 to 5.

The zinc powder in use was of spherical particles with diameters up to 15 microns and was of such purity as to contain about 0.01% by weight of impurities such as cadmium and iron. (The zinc powder used in all the other Examples presented subsequently was of the same grade). The glass frit in use was the mixture of six parts by weight PbO, two parts by weight $B_2O_3$, and two parts by weight $SiO_2$, having a softening point of 560° C. and 325-mesh particles. The organotitanium compound in use was the powder of $Ti(OC_{17}H_{35})_4$, with a particle size less than 30 microns. As the vehicle there was employed alpha-terpineol admixed with 5% by weight ethylcellulose as an organic binder. (The same vehicle was used in all the following Examples.)

Figure 2:
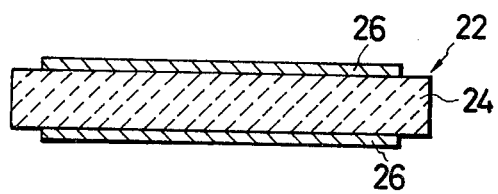
FIG. 2 is an axial section through a ceramic capacitor having conductors made from the zinc paste.

The above prepared five examples of the zinc paste were each coated on opposite faces of each of several discs of ceramic semiconductor material composed principally of strontium titanate, $SrTiO_3$, and were baked thereon. FIG. 2 is a section through each ceramic capacitor 22 thus fabricated, showing the ceramic disc 24 and the pair of zinc conductors 26 on its opposite faces. A more detailed description of the ceramic capacitors and the method of their fabrication follows.

The ceramic discs 24 of the capacitors 22 were prepared from a mixture of 98.8 mole % $SrTiO_3$, 0.8 mole % germanium dioxide, $GeO_2$, and 0.4 mole % niobium oxide, $Nb_2O_5$, admixed with polyvinyl alcohol as an organic binder. After having been agitated, the mixture was molded into discs at a pressure of approximately one ton per square centimeter. The disc-like moldings were baked for three hours at a temperature of 1420° C. in a furnace, in which there was a gaseous atmosphere of 98% by capacity of molecular nitrogen ($N_2$) and 2% by capacity of molecular hydrogen ($H_2$). The ceramic discs thus formed had each a diameter of eight millimeters (mm) and a thickness of 0.4 mm. The discs were then coated with a $PbO-B_2O_3-Bi_2O_3$ glass paste. The coated ceramic discs were heated and held at a temperature of 1200° C. for three hours, thereby causing diffusion of the glass ingredients into the ceramic to insulate its particles.

For the fabrication of the conductors on the opposite faces of each ceramic disc the zinc paste of the above specified composition was first "printed" on one face of the disc through a 200-mesh Teflon (trademark) screen. The coated discs were placed in a drying furnace for drying the coatings at 150° C. for 10 minutes. Then the zinc paste was coated on the other face of each disc, and the coatings were dried in the same manner. Then, placed on an iron net, the ceramic discs with the dried coatings were introduced into a tunnel-shaped heater, in which the coatings were baked at approximately 700° C., above the melting point of zinc, for 10 minutes in exposure to atmosphere. The coated ceramic discs were held in the heater for a total of 40 minutes including the time for raising and lowering its temperature. There were thus completed the conductors 26 of FIG. 2, each having a diameter of 7.8 mm and a thickness of 15 microns.

As has been explained in conjunction with FIG. 1, the heating of the zinc paste coatings in atmosphere, as above, causes oxidation of the zinc particles. Being surrounded by the glass and titanium compound, however, each zinc particle undergoes oxidation only to a limited depth from its surface. It has also been stated that the zinc paste of this invention is baked at a temperature above the melting point of zinc, unlike the conventional silver paste which is fired at a temperature below the melting point of silver. Thus the unoxidized interiors of the zinc particles melt and, disrupting the oxide claddings, become bridge to each other to form the conductors.

Although oxide films also exist on the exposed surfaces of the zinc conductors and at the interfaces between the conductors and the ceramic body, they are too thin to present any serious electrical or mechanical problems. However, if a difficulty is encountered as in soldering leads to the conductors, the oxide films may be removed from their surfaces as by a chemical agent, and these surfaces may be covered with a metal layer that will not easily oxidize.

During such baking of the coatings the vehicle of the zinc paste evaporates, the glass frit softens, and the organotitanium compound decomposes to become, either in part or in whole, titanium oxide ($TiO_2$). It is thus seen that the glass frit and the organotitanium compound function as inorganic binders and oxidation inhibitors.

The ceramic capacitors with the zinc conductors prepared as above were tested as to capacitance, dielectric loss tangent, and the strength with which the conductors were bonded to the ceramic discs against pulling stress. Table 1 gives the results. In this and all the succeeding tables each listed value is the average of ten samples. Also, in all tables given herein, the capacitance of the capacitors represents the values measured at a frequency of 1 kHz, in nanofarads (nF), and the dielectric loss tangent represents 100 times the values measured at 1 kHz. For the actual values of dielectric loss tangent, therefore, the tabulated figures should be multiplied by $10^{-2}$.

Figure 3:
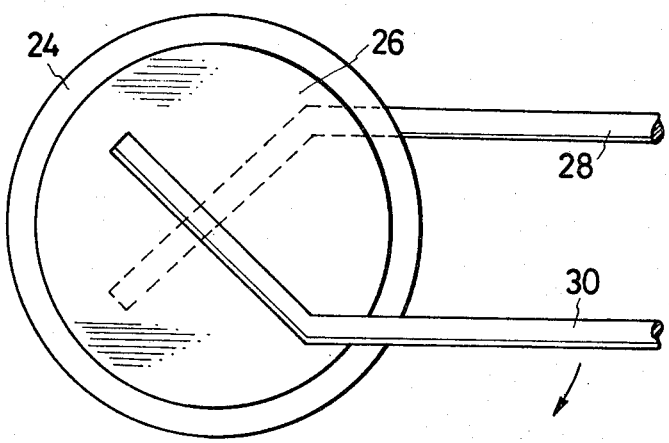
FIG. 3 is a plan view explanatory of the way in which the ceramic capacitor is tested as to the strength with which the conductors adhere to the ceramic body against tensile stress.

FIG. 3 explains the method adapted for measurement of the strength with which the zinc conductors 26 adhere to the ceramic disc 24 of each capacitor. There were first prepared two annealed copper wires 28 and 30 for each capacitor, each wire having a diameter of 0.6 mm and a length of 35.0 mm. Each wire was bent at a point approximately 4 mm from one end, as shown. The bent end of each wire was soldered to one of the conductors 26 of each capacitor with application of ultrasonic vibration. Then, with one wire 28 held against movement, the other was pulled slowly via a spring scale in the arrow marked direction, until either of the conductors came off the ceramic disc 24. The reading in kilograms (kg) of the spring scale at the moment is given as the tensile strength of each capacitor.

TABLE 1

| Examples | Paste ingredients | | Capacitor properties | | |
|---|---|---|---|---|---|
| | PbO—B$_2$O$_3$—SiO$_2$ glass frit, weight part | Ti(OC$_{17}$H$_{35}$)$_4$ (organotitanium compound), weight part | Capacitance, nF | Dielectric loss tangent, $\times 10^{-2}$ | Tensile strength, kg |
| 1 | 0.01 | 0.01 | 54 | 1.46 | 1.1 |
| 2 | 0.01 | 14.99 | 54 | 1.47 | 1.0 |
| 3 | 0.50 | 5.00 | 64 | 0.53 | 2.1 |
| 4 | 1.00 | 1.00 | 64 | 0.55 | 2.2 |
| 5 | 10.00 | 0.01 | 55 | 1.46 | 1.1 |

By way of comparison there was prepared a silver paste composed of 60% by weight of spherical silver particles sized 0.1 to 3.0 microns, 2% by weight PbO-B$_2$O$_3$-SiO$_2$ glass frit with a softening point of 550° C., and 20% by weight of a vehicle, in accordance with the prior art. The silver paste was coated on opposite faces of SrTiO$_3$ ceramic discs identical with those used in the above Examples of the invention. As had been conventionally practiced with the silver paste, the coatings on the ceramic discs were baked at a temperature less than the melting point of silver, to form conductors each with a diameter of 7.8 mm and a thickness of three microns. Measured under the same conditions as those specified above, the capacitance of the thus fabricated conventional capacitors averaged 47 nF, their dielectric loss tangent $0.56 \times 10^{-2}$, and their tensile strength 1.5 kg.

From these figures, and in consideration of the characteristics of the capacitors with the silver conductors, the acceptable criteria of the three properties in question for any capacitors with the SrTiO$_3$ ceramic semiconductor bodies will now be determined as follows: capacitance, not less than 47 nF; dielectric loss tangent, not more than $1.5 \times 10^{-2}$; and tensile strength, not less than 0.5 kg.

An inspection of Table 1 will reveal that the capacitors with their conductors made from the zinc pastes containing from about 0.01 to 10.00 parts by weight of the PbO-B$_2$O$_3$-SiO$_2$ glass frit and from about 0.01 to 14.99 parts by weight of Ti(OC$_{17}$H$_{35}$)$_4$ with respect to 100 parts by weight of zinc powder in accordance with the invention all satisfy the above criteria of capacitance, dielectric loss tangent, and tensile strength. Consider the capacitors of Examples 3 and 4 in particular, with their conductors fabricated from the zinc pastes containing 0.5-1.0 part by weight of the glass frit and 1.0-5.0 parts by weight of the organotitanium compound. The capacitance and tensile strength of these capacitors are far better than the criteria. For a given capacitance, therefore, the zinc pastes of such compositions make it possible to reduce the size of capacitors of this class. Further, since the zinc paste of this invention allows baking in atmosphere as aforesaid, the capacitors are mass producible, and at drastically reduced costs because of the cheapness of zinc compared with silver.

It has been experimentally confirmed that if the combined proportion of the glass frit and the organotitanium compound falls short of 0.02 part by weight or exceeds 15.00 parts by weight, the zinc paste makes the dielectric loss tangent of capacitors inordinately high.

EXAMPLES 6-70

In these Examples there were tried glass frits of several different compositions, in various combinations and in various proportions. The glass frits prepared were the following eight, referenced A to H for convenience:

A: The same glass frit as used in Examples 1-5.
B: PbO-B$_2$O$_3$-SiO$_2$; softening point (s.p.) 460° C.
C: PbO-B$_2$O$_3$-SiO$_2$; s.p. 600° C.
D: PbO-B$_2$O$_3$; s.p. 415° C.
E: PbO-B$_2$O$_3$; s.p. 430° C.
F: ZnO-B$_2$O$_3$-SiO$_2$; s.p. 560° C.
G: ZnO-B$_2$O$_3$-SiO$_2$; s.p. 625° C.
H: PbO-B$_2$O$_3$-SiO$_2$; s.p. 500° C.

Two or more of these glass frits A to H were variously combined, in various proportions, as specified in Table 2. To 100 parts by weight of zinc powder each combination of glass frits was added in several different proportions ranging from 0.01 to 10.00 parts by weight, also as given in Table 2. Also tested in these Examples were two organotitanium compounds of various proportions ranging from 0.01 to 14.99 parts by weight. One, used in Examples 6-20, 36-45, 51-60 and 66-70 was Ti(OC$_{17}$H$_{35}$)$_4$, as in Examples 1-5. The other, used in Examples 21-35, 46-50 and 61-65, was Ti(O-iC$_3$H$_7$)$_2$[OC(CH$_3$)CHCOCH$_3$]$_2$ dissolved in toluene. The proportions of the latter organotitanium compound listed in Table 2 do not include the solvent.

The various mixtures of the zinc powder, glass frits and organotitanium compounds were admixed with the same vehicle as in Examples 1-5. The amount of the vehicle for pasting each mixture was of course less in Examples 21-35, 46-50 and 61-65 than in Examples 6-20, 36-45, 51-60 and 66-70 because of the use of the organotitanium compound in the form of a solution. The admixtures were agitated for 15 hours, thus preparing the sixty-five zinc pastes of Examples 6-70. Capacitors were fabricated by use of these zinc pastes through the procedure of Examples 1-5, and their capacitance, dielectric loss tangent, and tensile strength were measured by the same methods as in Examples 1-5. Table 2 represents the results.

In Table 2 the glass frits in use are designated by their reference characters A to H, and the proportions of the frits of each combination are given by weight. Take, for example, the zinc paste of Example 6. This paste uses a combination of the PbO-B$_2$O$_3$-SiO$_2$ glass frit B, with a softening point of 460° C., and the PbO-B$_2$O$_3$-SiO$_2$ glass frit C, with a softening point of 600° C., in a ratio by weight of one to four. To 100 parts by weight of zinc powder 0.01 part by weight of the combination of the glass frits B and C is added to form the zinc paste in admixture with the organotitanium compound, Ti(OC$_{17}$H$_{35}$)$_4$ in this Example, and the vehicle.

The results of Table 2 prove that the use of the glass frits having compositions and softening points other than those of the glass frit A of Examples 1-5, in combination with each of two different organotitanium compounds, can provide zinc pastes suitable for use as the conductors of ceramic capacitors.

EXAMPLES 71-76

These Examples were intended to ascertain the results of the use of one or more of the above enumerated additives in the zinc paste of this invention. Thus, to 100 parts by weight of zinc powder, there were added PbO-$B_2O_3$-$SiO_2$ glass frit of Examples 1-5, the organotitanium compound of Examples 1-5, and one or

TABLE 2

| Examples | Paste composition | | | Capacitor properties | | |
|---|---|---|---|---|---|---|
| | Total amount of glass frits, weight part | Glass frits in use and their weight ratio | Organo-titanium compound, weight part | Capacitance, nF | Dielectric loss tangent, $\times 10^{-2}$ | Tensile strength, kg |
| 6 | 0.01 | B:C = 1:4 | 0.01 | 53 | 1.43 | 1.1 |
| 7 | 0.01 | B:C = 1:1 | 0.01 | 54 | 1.41 | 1.2 |
| 8 | 0.01 | B:C = 4:1 | 0.01 | 54 | 1.43 | 1.1 |
| 9 | 0.01 | B:C = 1:4 | 14.99 | 53 | 1.44 | 1.1 |
| 10 | 0.01 | B:C = 1:1 | 14.99 | 53 | 1.42 | 1.0 |
| 11 | 0.01 | B:C = 4:1 | 14.99 | 54 | 1.44 | 1.1 |
| 12 | 0.50 | B:C = 1:4 | 5.00 | 64 | 0.51 | 2.1 |
| 13 | 0.50 | B:C = 1:1 | 5.00 | 63 | 0.51 | 2.2 |
| 14 | 0.50 | B:C = 4:1 | 5.00 | 64 | 0.52 | 2.1 |
| 15 | 1.00 | B:C = 1:4 | 1.00 | 63 | 0.53 | 2.2 |
| 16 | 1.00 | B:C = 1:1 | 1.00 | 64 | 0.54 | 2.3 |
| 17 | 1.00 | B:C = 4:1 | 1.00 | 64 | 0.53 | 2.1 |
| 18 | 10.00 | B:C = 1:4 | 0.01 | 54 | 1.43 | 1.1 |
| 19 | 10.00 | B:C = 1:1 | 0.01 | 55 | 1.42 | 1.1 |
| 20 | 10.00 | B:C = 4:1 | 0.01 | 54 | 1.42 | 1.0 |
| 21 | 0.01 | D:A = 1:4 | 0.01 | 54 | 1.42 | 1.1 |
| 22 | 0.01 | D:A = 1:1 | 0.01 | 53 | 1.41 | 1.2 |
| 23 | 0.01 | D:A = 4:1 | 0.01 | 54 | 1.42 | 1.2 |
| 24 | 0.01 | D:A = 1:4 | 14.99 | 53 | 1.41 | 1.0 |
| 25 | 0.01 | D:A = 1:1 | 14.99 | 54 | 1.42 | 1.1 |
| 26 | 0.01 | D:A = 4:1 | 14.99 | 54 | 1.43 | 1.2 |
| 27 | 0.50 | D:A = 1:4 | 5.00 | 64 | 0.49 | 2.0 |
| 28 | 0.50 | D:A = 1:1 | 5.00 | 64 | 0.50 | 2.1 |
| 29 | 0.50 | D:A = 4:1 | 5.00 | 63 | 0.50 | 2.1 |
| 30 | 1.00 | D:A = 1:4 | 1.00 | 63 | 0.51 | 2.2 |
| 31 | 1.00 | D:A = 1:1 | 1.00 | 63 | 0.51 | 2.1 |
| 32 | 1.00 | D:A = 4:1 | 1.00 | 64 | 0.52 | 2.2 |
| 33 | 10.00 | D:A = 1:4 | 0.01 | 54 | 1.41 | 1.0 |
| 34 | 10.00 | D:A = 1:1 | 0.01 | 54 | 1.42 | 1.1 |
| 35 | 10.00 | D:A = 4:1 | 0.01 | 54 | 1.41 | 1.0 |
| 36 | 0.01 | D:E = 1:1 | 0.01 | 54 | 1.42 | 1.1 |
| 37 | 0.01 | D:E = 1:1 | 14.99 | 54 | 1.44 | 1.1 |
| 38 | 0.50 | D:E = 1:1 | 5.00 | 64 | 0.51 | 1.9 |
| 39 | 1.00 | D:E = 1:1 | 1.00 | 64 | 0.53 | 2.1 |
| 40 | 10.00 | D:E = 1:1 | 0.01 | 53 | 1.41 | 1.0 |
| 41 | 0.01 | F:G = 1:1 | 0.01 | 54 | 1.41 | 1.0 |
| 42 | 0.01 | F:G = 1:1 | 14.99 | 53 | 1.43 | 1.1 |
| 43 | 0.50 | F:G = 1:1 | 5.00 | 63 | 0.50 | 2.1 |
| 44 | 1.00 | F:G = 1:1 | 1.00 | 64 | 0.52 | 2.2 |
| 45 | 10.00 | F:G = 1:1 | 0.01 | 54 | 1.42 | 1.1 |
| 46 | 0.01 | G:B = 1:1 | 0.01 | 54 | 1.43 | 1.1 |
| 47 | 0.01 | G:B = 1:1 | 14.99 | 54 | 1.43 | 1.2 |
| 48 | 0.50 | G:B = 1:1 | 5.00 | 63 | 0.48 | 2.2 |
| 49 | 1.00 | G:B = 1:1 | 1.00 | 64 | 0.50 | 2.2 |
| 50 | 10.00 | G:B = 1:1 | 0.01 | 54 | 1.41 | 1.2 |
| 51 | 0.01 | F:D = 1:1 | 0.01 | 54 | 1.39 | 1.1 |
| 52 | 0.01 | F:D = 1:1 | 14.99 | 53 | 1.41 | 1.0 |
| 53 | 0.50 | F:D = 1:1 | 5.00 | 64 | 0.49 | 2.0 |
| 54 | 1.00 | F:D = 1:1 | 1.00 | 63 | 0.53 | 2.1 |
| 55 | 10.00 | F:D = 1:1 | 0.01 | 53 | 1.40 | 1.1 |
| 56 | 0.01 | D:A:G = 1:1:1 | 0.01 | 55 | 1.40 | 1.0 |
| 57 | 0.01 | D:A:G = 1:1:1 | 14.99 | 54 | 1.39 | 1.2 |
| 58 | 0.50 | D:A:G = 1:1:1 | 5.00 | 64 | 0.41 | 2.1 |
| 59 | 1.00 | D:A:G = 1:1:1 | 1.00 | 63 | 0.46 | 2.0 |
| 60 | 10.00 | D:A:G = 1:1:1 | 0.01 | 54 | 1.41 | 1.2 |
| 61 | 0.01 | D:B:A:G = 1:1:1:1 | 0.01 | 54 | 1.40 | 1.1 |
| 62 | 0.01 | D:B:A:G = 1:1:1:1 | 14.99 | 53 | 1.41 | 1.2 |
| 63 | 0.50 | D:B:A:G = 1:1:1:1 | 5.00 | 65 | 0.45 | 2.3 |
| 64 | 1.00 | D:B:A:G = 1:1:1:1 | 1.00 | 64 | 0.49 | 2.0 |
| 65 | 10.00 | D:B:A:G = 1:1:1:1 | 0.01 | 54 | 1.39 | 1.1 |
| 66 | 0.01 | D:B:H:A:G = 1:1:1:1:1 | 0.01 | 56 | 1.41 | 1.1 |
| 67 | 0.01 | D:B:H:A:G = 1:1:1:1:1 | 14.99 | 54 | 1.43 | 1.2 |
| 68 | 0.50 | D:B:H:A:G = 1:1:1:1:1 | 5.00 | 63 | 0.46 | 2.2 |
| 69 | 1.00 | D:B:H:A:G = 1:1:1:1:1 | 1.00 | 64 | 0.50 | 2.1 |
| 70 | 10.00 | D:B:H:A:G = 1:1:1:1:1 | 0.01 | 54 | 1.38 | 1.2 | more of the powders of $Pb_3O_4$, $Bi_2O_3$, $Pr_6O_{11}$, CuO and CdO, in proportions set forth in Table 3. The various mixtures of the zinc powder, glass frit, organotitanium compound, and additives were each admixed with about 20% by weight of the same vehicle as used in Examples 1–5. The admixtures were agitated for 15 hours to prepare the six different zinc pastes of Examples 71–76.

Capacitors were made by use of these zinc pastes through the same procedure as in Examples 1–5. The capacitance, dielectric loss tangent, and tensile strength of the capacitors were measured also by the same methods as in Examples 1–5. Table 3 represents the results.

As will be understood from the tabulated results, the addition of one or more of the above powdered metal oxides results in the improvement of tensile strength. Although the zinc pastes of Examples 71–76 contain 0.5 or 1.0 parts by weight of the glass frit, 0.5 or 1.0 parts by weight of the organotitanium compound, and 0.1 part by weight each of one or more additives, experiment has proved that capacitors having properties meeting the acceptable critiera are obtainable if the combined proportion of the glass frit and the organotitanium compound is up to about 15 parts by weight, or if the proportion of the additive or additives is in the range of about 0.01–5.00 parts by weight.

oxide, $Nb_2O_5$, and 0.2 mole % manganese dioxide, $MnO_2$, to which was added a solution of polyvinyl alcohol as an organic binder. The mixture was molded into discs, and these were fired in a reductive atmosphere. Each ceramic disc thus fabricated had a diameter of 8 mm and a thickness of 0.8 mm.

Then the zinc pastes prepared as in Examples 1–5 and 71–76 were coated on the ceramic discs, and the coatings were baked at 750° C. for 10 minutes in a tunnel-shaped heater in exposure to atmosphere, thereby completing varistor electrodes on the ceramic discs. The coated ceramic discs were held in the heater for a total of 40 minutes including the time required for raising and lowering the temperature of the heater.

In order to ascertain the properties of the varistors thus prepared, there were measured the voltage $E_{10}$ of each varistor when a current of 10 milliamperes (mA) flows therethrough, and the voltage $E_1$ when a current of 1 mA flows therethrough. From these voltages $E_{10}$ and $E_1$ the nonlinearity coefficient $\alpha$ was computed by the equation, $\alpha = 1/\log (E_{10}/E_1)$. Also, in order to determine the strength with which the zinc electrodes of the varistors adhere to the ceramic discs, a copper wire of 60.0 mm in length and 0.6 mm in diameter was soldered perpendicularly to the center of one of the electrodes of each varistor, with use of approximately

TABLE 3

| | Paste ingredients | | | Capacitor properties | | |
|---|---|---|---|---|---|---|
| Examples | $PbO-B_2O_3-SiO_2$ glass frit, weight part | $Ti(OC_{17}H_{35})_4$ (organo-titanium compound), weight part | Additive (each 0.1 weight part) | Capacitance, nF | Dielectric loss tangent, $\times 10^{-2}$ | Tensile strength, kg |
| 71 | 0.5 | 5.0 | $Pb_3O_4$ | 65 | 0.52 | 2.2 |
| 72 | 0.5 | 5.0 | $Pb_3O_4$, $Bi_2O_3$ & $Pr_6O_{11}$ | 65 | 0.52 | 2.2 |
| 73 | 0.5 | 5.0 | $Pb_3O_4$, $Bi_2O_3$, $Pr_6O_{11}$, CuO & CdO | 66 | 0.51 | 2.2 |
| 74 | 1.0 | 1.0 | CdO | 65 | 0.54 | 2.2 |
| 75 | 1.0 | 1.0 | $Pr_6O_{11}$, CuO & CdO | 65 | 0.53 | 2.2 |
| 76 | 1.0 | 1.0 | $Pb_3O_4$, $Bi_2O_3$, $Pr_6O_{11}$, CuO & CdO | 66 | 0.52 | 2.3 |

Figure 4:
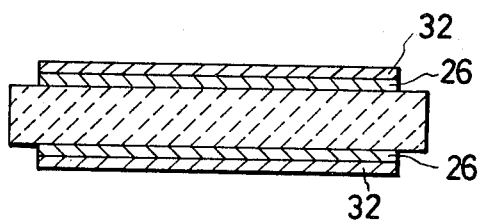
FIG. 4 is an axial section through another example of ceramic capacitor having conductors made from the zinc paste.

It may be mentioned, in conjunction with the foregoing Examples dealing with the application of the invention to ceramic capacitors, that the conductors formed on the ceramic bodies by use of the zinc paste are less solderable than the conventional silver conductors. The solderability of the zinc conductors is easy to improve, however, by covering the zinc conductors with layers of a less ionizable metal such as copper or nickel by electroless plating. FIG. 4 shows at 32 such platings of more solderable metal on the zinc conductors 26 of capacitors. Alternatively such solderable overlayers may be formed by the plating, vapor deposition, or coating of gold or silver. The use of such precious metals will not significantly add to the cost of the capacitors because the overlayers can be of minimal thickness.

EXAMPLES 77–78

These Examples deal with the applicability of the zinc pastes in accordance with the invention to the electrodes of ceramic varistors. The zinc pastes tested were identical in composition with those of Examples 1–5 and 71–76. First, for the preparation of ceramic bodies for varistors, there was formed a mixture of 99.6 mole % titanium dioxide, $TiO_2$, 0.2 mole % niobium 50 mg of solder and by application of ultrasonic vibration. With the ceramic disc of each varistor held against movement, the wire was pulled via a spring scale until the electrode came off the disc. The reading in kg of the spring scale at that time was recorded as the tensile strength T of the varistor. The results were as given in Table 4, wherein Examples 77 and 78 combinedly represent the values exhibited by the varistors using the zinc pastes of Examples 1–5 and 71–76 respectively.

TABLE 4

| | Zinc pastes | Varistor properties | | |
|---|---|---|---|---|
| Examples | in use | $E_{10}$, V | $\alpha$ | T, kg |
| 77 | Examples 1–5 | 9.6–10.9 | 3.0–3.4 | 2.0–2.1 |
| 78 | Examples 71–76 | 9.7–10.5 | 3.1–3.4 | 2.0–2.2 |

By way of comparison a silver paste of the composition described in connection with Examples 1–5 was coated on ceramic discs, which had themselves been fabricated as in Examples 77 and 78. The coatings were baked at a temperature less than the melting point of silver. Measured by the same methods as above, the voltage $E_{10}$ of the varistors averaged 10.5 V, their nonlinearity coefficient 3.3, and their tensile strength 1.8 kg. A comparison of these figures with those of Table 4 will show that the varistors with the zinc electrodes in accordance with the invention have approximately the same properties as do the varistors with the conventional silver electrodes.

Figure 5:
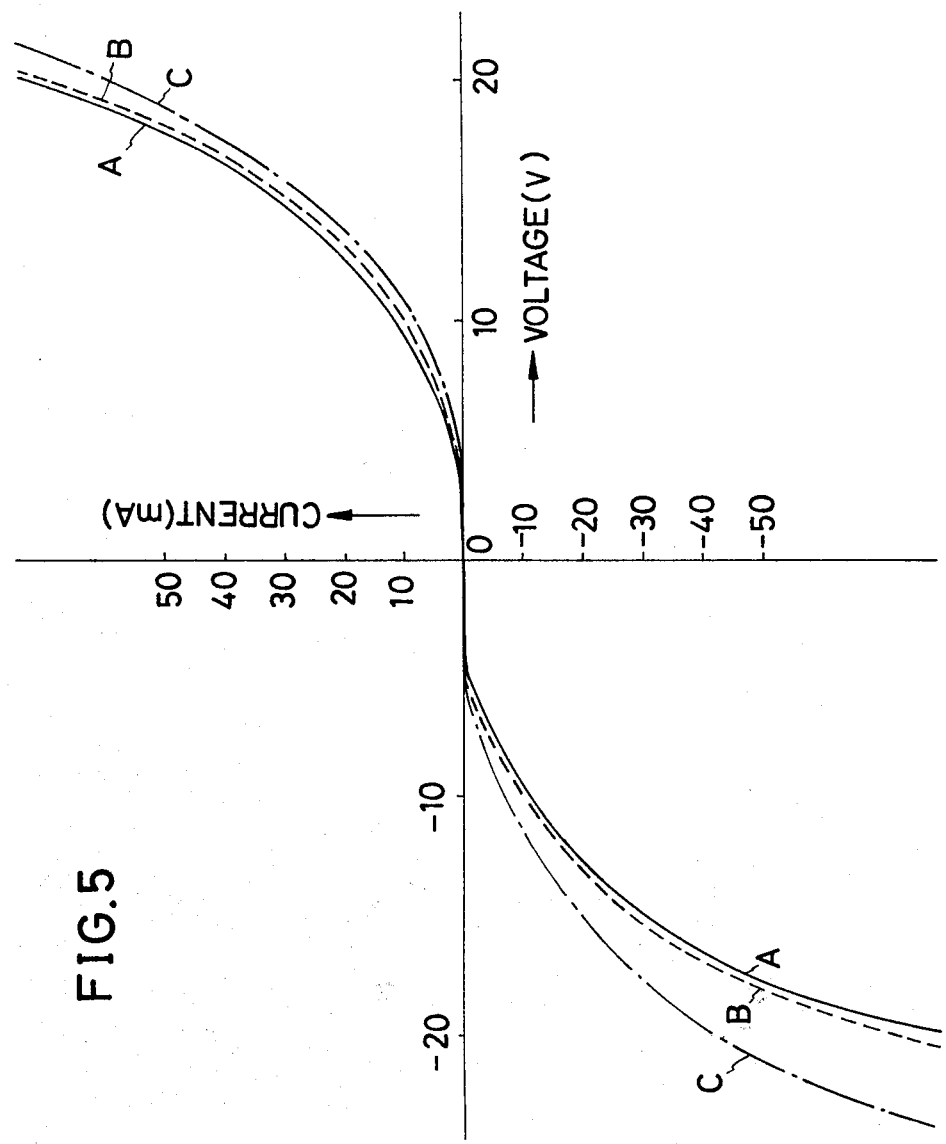
FIG. 5 is a graphic representation of the volt-ampere characteristics of some ceramic varistors having electrodes prepared from the zinc paste of the invention and from conventional materials.

For a study of the ohmic contact between the zinc electrodes and ceramic bodies of varistors, an electrode was formed on one face of each of several ceramic discs by use of the zinc paste of Example 4. An electrode of indium-gallium (In-Ga) alloy was formed on the other face of each ceramic disc. The curve A of FIG. 5 plots the mean volt-ampere characteristic of the thus fabricated varistors. Two other kinds of varistors were prepared by way of comparison, one having In-Ga electrodes on opposite faces of each ceramic disc and the other having a silver electrode and an In-Ga electrode on the opposite faces of each ceramic disc. The curves B and C of FIG. 5 represent the mean volt-ampere characteristics of the varistors with the In-Ga electrodes and of the varistors with the silver electrode and In-Ga electrode, respectively. As will be noted from comparison of the curves A and C, the zinc electrodes make better ohmic contact with the ceramic discs than do the silver electrodes.

Although the zinc paste of this invention is applied only to $SrTiO_3$ capacitors and $TiO_2$ varistors in the Examples disclosed herein, it also lends itself to use in $TiO_2$ ceramic capacitors, and $BaTiO_3$ ceramic capacitors, thermistors, and piezoelectric elements, among other applications, as has been confirmed by experiment. It will of course be seen that the solderable overlayers 32 of FIG. 4 can be formed not only on the zinc conductors of capacitors but also on the zinc electrodes of varistors.

We claim:

1. An electroconductive paste to be baked on ceramic bodies to provide the conductors or electrodes of ceramic capacitors, varistors or the like, comprising 100 parts by weight of zinc powder, from about 0.01 to about 10.00 parts by weight of a glass frit, from about 0.01 to about 14.99 parts by weight of an organotitanium compound, the sum of the glass frit and the organotitanium compound in use being up to about 15 parts by weight, and an organic vehicle for pasting the mixture of the zinc powder and the glass frit and the organotitanium compound, the organic vehicle being driven off upon baking of the pasted mixture such that it does not form part of the completed conductors.

2. An electroconductive paste as claimed in claim 1, wherein the zinc powder is of spherical particles.

3. An electroconductive paste as claimed in claim 1 or 2, wherein the zinc powder has an average particle size ranging from about 0.1 to 30.0 microns.

4. An electroconductive paste as claimed in claim 1, wherein the glass frit is of about 325-mesh particles.

5. An electroconductive paste as claimed in claim 1 or 4, wherein the glass frit has a softening point ranging from about 400° to 800° C.

6. An electroconductive paste as claimed in claim 1 or 4, wherein the glass frit is selected from the class consisting of a $PbO-B_2O_3-SiO_2$ glass frit, a $PbO-B_2O_3$ glass frit, and a $ZnO-B_2O_3-SiO_2$ glass frit, all with a softening point ranging from about 415° to 625° C.

7. An electroconductive paste as claimed in claim 1, wherein the organotitanium compound is selected from the class consisting of $Ti(O-C_{17}H_{35})_4$, $Ti(O-C_4H_9)_4$, $Ti(n-C_4H_9O)_2(CH_2C_6H_5)_2$, $Ti(O-iC_3H_7)_2[OC(CH_3)CHCOCH_3]_2$, $Ti(O-nC_4H_9)_2[OC_2H_4N(C_2H_4OH)_2]_2$, and $Ti(OH)_2[OCH(CH_3)COOH]_2$.

8. An electroconductive paste as claimed in claim 1, further comprising from about 0.01 to 5.00 parts by weight of an additive selected from the class consisting of Pb, Bi, Pr, Cu, Cd, and the compounds of these metallic elements.

9. An electroconductive paste as claimed in claim 8, wherein the compounds are oxides.

10. An electroconductive paste as claimed in claim 9, wherein the oxides include $Pb_3O_4$, $Bi_2O_3$, $Pr_6O_{11}$, CuO, and CdO.

* * * * *